HUNTER & ISHAM.
Gate.
No. 15,518. Patented Aug. 12, 1856.
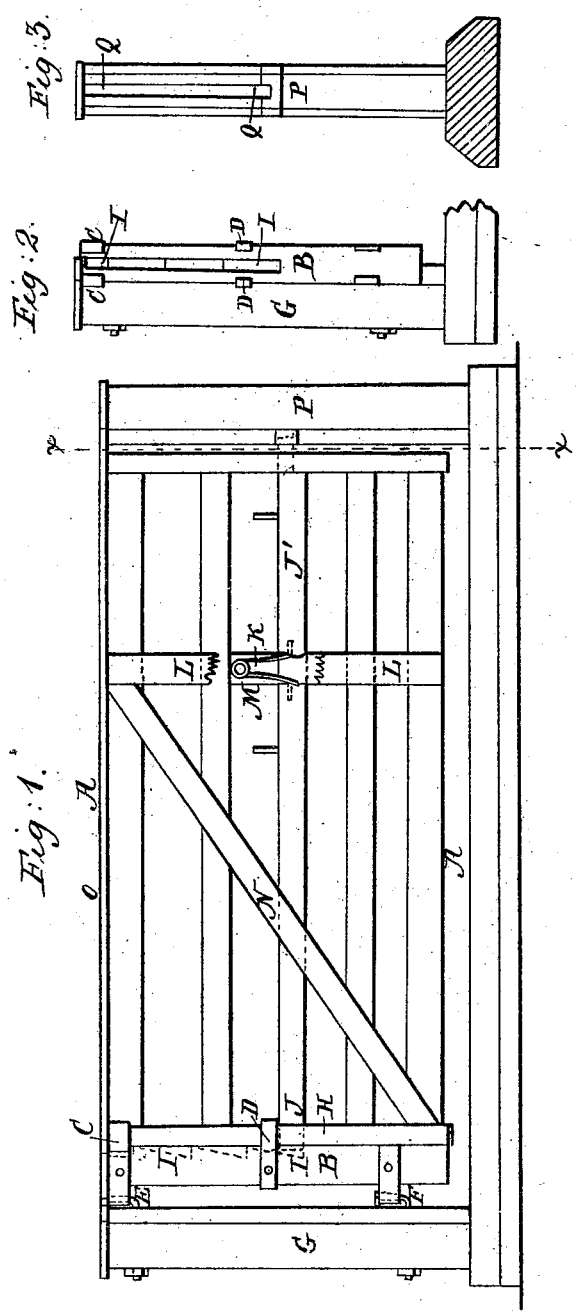

UNITED STATES PATENT OFFICE.

C. HUNTER AND N. ISHAM, OF NORWALK, OHIO.

METHOD OF RAISING, LOWERING, AND OPERATING FARM-GATES.

Specification of Letters Patent No. 15,518, dated August 12, 1856.

*To all whom it may concern:*

Be it known that we, C. HUNTER and N. ISHAM, of Norwalk, in the county of Huron and State of Ohio, have invented a new and Improved Gate; and we do hereby declare that the following is a full and exact description of the same, reference being had to the accompanying drawings, in which—

Figure 1 is a view of the gate, and Figs. 2, and 3, detached sections of the same.

Like letters represent like parts in the several figures.

The gate, A, may be constructed of any desirable size, and is connected to the stile B, by the clasps C, D. The clasp C, is attached to the hook E, thereby forming a hinge joint; by means of this hinge, and the hinge F, the gate is hung to the post G, as seen in Fig. 1.

The clasps C, D, while they hold the gate in place, allow it to be raised and lowered, being open in front sufficiently for that purpose, as seen in Fig. 2. The clasps being fastened to the stile B, the stile H, to which are secured the bars, slides up and down in them, in raising and lowering the gate. In the stile B is a groove as seen at I, I, Fig. 2, forming a series of steps and inclined planes as shown by the dotted lines I, Fig. 1. The end of the bar J, enters this groove, and is retained there by the action of the spring K, which is placed between the braces L and M by which it is protected. The bar J, slides between, the braces L, M, and N, and through the stile H.

The gate is represented as being down and is held in this position by the bar J in the lowest of the catches I; the top O, of the gate, aids also in retaining it in this position, as the end extends over the stile B.

In raising the gate the inclination of the grooves moves back the bar J, until it slips into the notch above by the action of the spring K; by this means the gate may be raised to the desired height for the purpose of allowing small animals to pass through, and to keep back large stock, as it is often necessary to separate the smaller from the larger stock; when the gate is thrown open, the animals being all anxious to pass out, it is difficult to divide them.

The gate is lowered by withdrawing the bar from the notches, and it will then descend by its own weight to the desired place, and be held there in the manner described.

In the post P, is a groove as seen at Q, Q, Fig. 3, this groove is of the same length as the groove I, and in it slides the end of the bar J'. The spring K acts upon the bar J' in the same manner as upon the bar J.

In swinging open the gate, it is moved back so that the end will be free from the groove, and in closing it, the bar is moved back by the inclined sides until it enters the groove by the action of the spring K.

The gate will swing in either direction in opening and closing, and whether the gate be raised or lowered.

What we claim as new and our improvement, and what we desire to secure by Letters Patent, is,

The bars J, J', spring K, groove I, and clasps C, D, when arranged as herein described, and for the purpose set forth.

CHESTER HUNTER.
N. ISHAM.

Witnesses:
  W. F. DAY,
  ISAAC TRUMBULL,
  A. C. FRY,
  T. W. GRAVES.